United States Patent Office 3,344,584
Patented Oct. 3, 1967

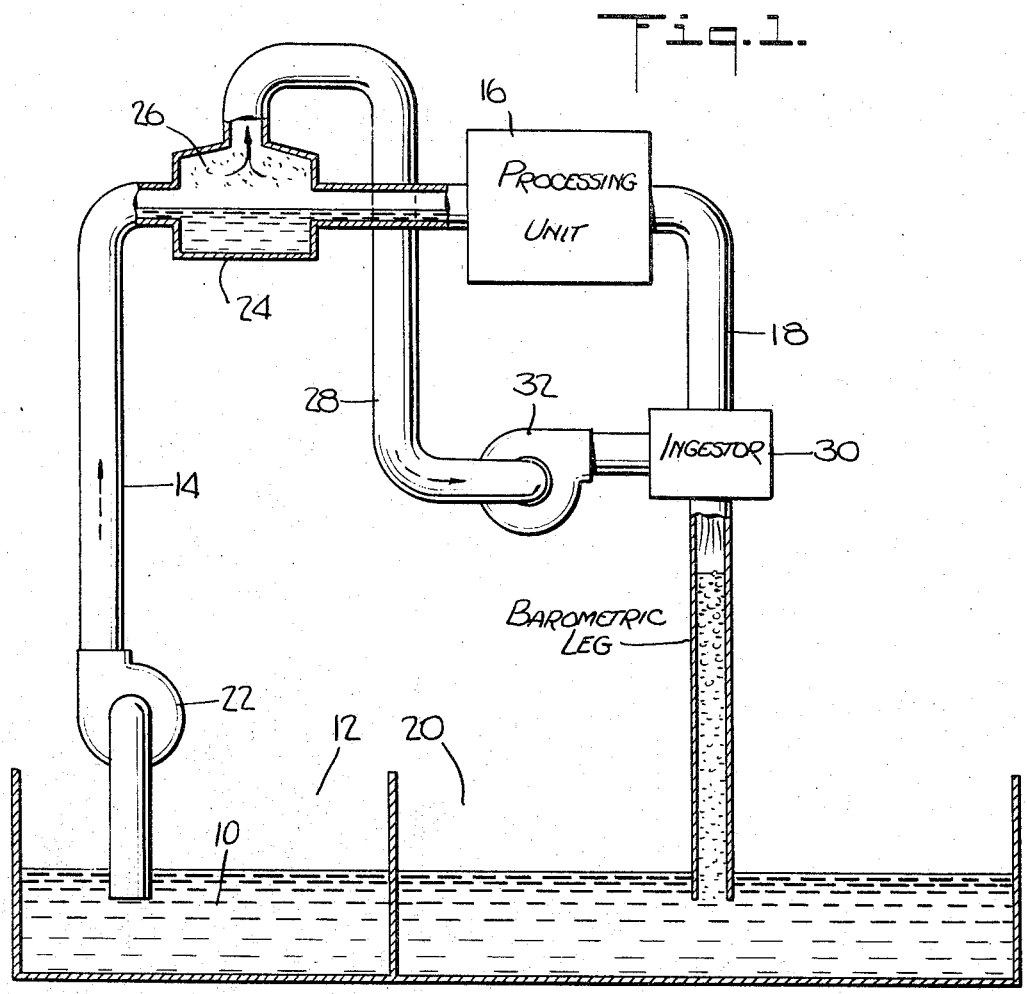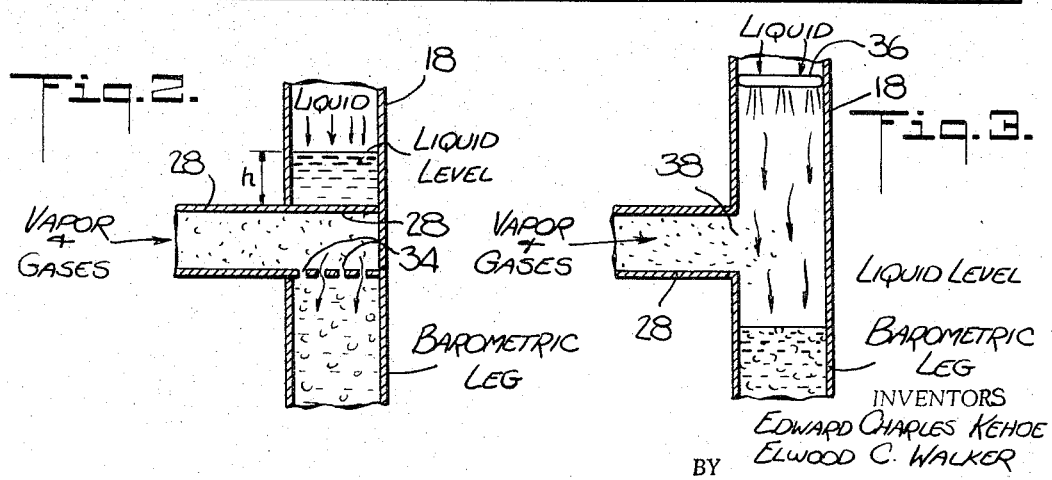

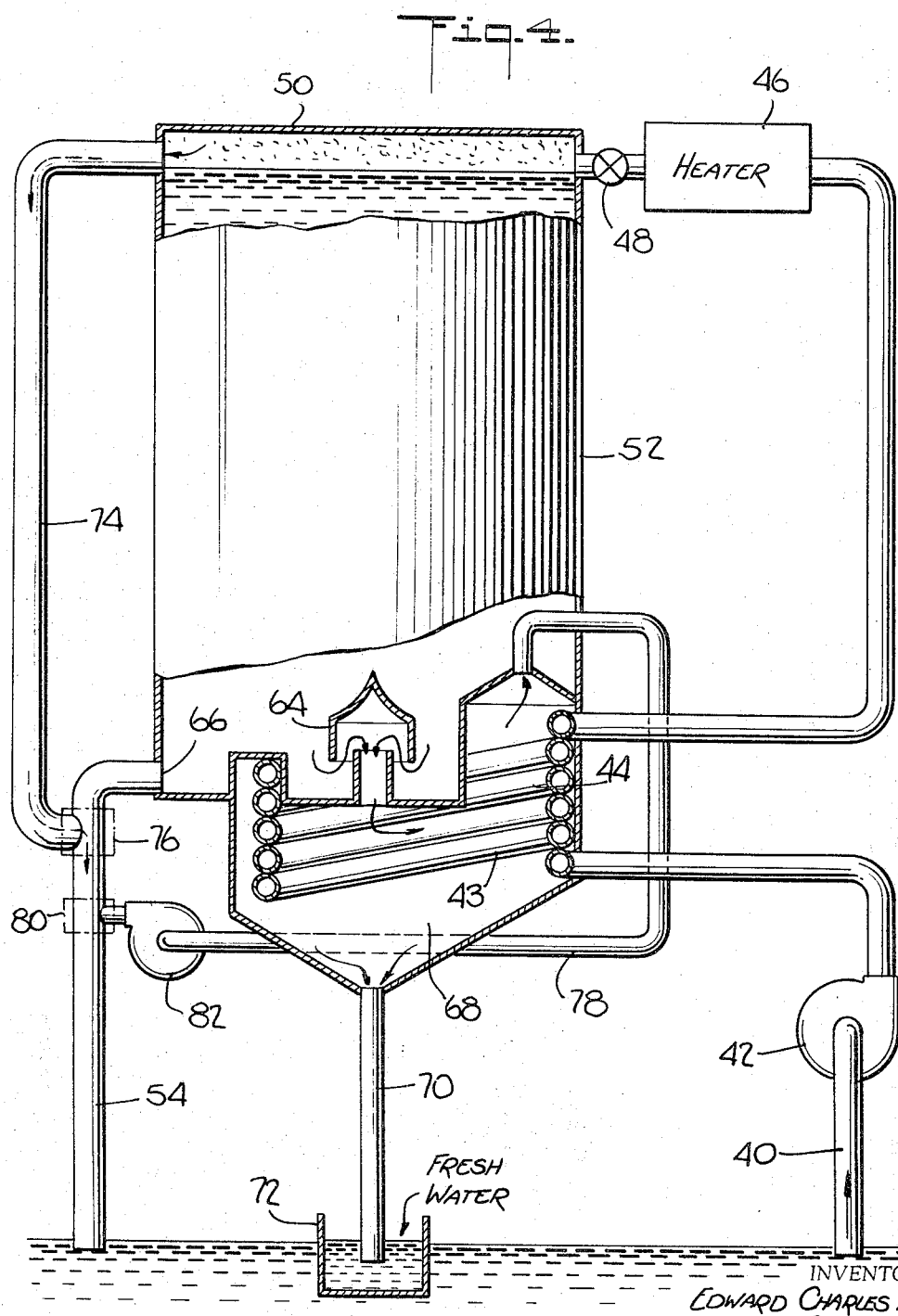

3,344,584
METHOD AND APPARATUS FOR DEGASSING AND DISTILLING LIQUID
Edward C. Kehoe and Elwood C. Walker, North Caldwell, N.J., assignors, by mesne assignments, to Saline Water Conversion Corporation, a corporation of New York
Filed July 29, 1964, Ser. No. 385,841
13 Claims. (Cl. 55—46)

This invention relates to the processing of liquids and more particularly it concerns a method and apparatus for the efficient handling of liquids under conditions which cause gases and vapors to be driven out of liquid solution.

Most liquids are characterized by a certain ability to retain gases in solution. The amount of gas capable of being so held in solution depends upon the pressure upon the liquid; and to a certain degree, upon its temperature. As the ambinet pressure is reduced, the liquid becomes less capable of holding these gases; and consequently, they are released from solution and bubble up through the top surface of the liquid. This variable solubility phenomenon is troublesome where liquids are to be processed continuously at low pressures. As the released gases accumulate in the processing system, they produce a loss of vacuum which may either obstruct liquid flow through the system or may hinder the processing operation itself.

The above described problem is of particular significance in connection with the evaporative desalination of sea water. Sea water in its natural state and under normal atmospheric conditions has dissolved therein approximately 20–22 parts per million by weight of air and other gases. When this water is subjected to the evaporative conditions of a desalination system, these gases come out of solution and intermix with the vapor being produced; with the result that fluid flow is obstructed and the overall operation of the system is impeded.

In the past it had been the practice to deaerate the saline water prior to processing. This was done by heating the water to its boiling point and thus driving the dissolved gases out of solution prior to the actual evaporation of the liquid. This high temperature boiling technique is very costly however, for it not only requires a great amount of heat but the heat must be supplied at high temperatures. In general, the cost of heat energy increases rapidly with temperature.

It has been possible to achieve evaporative desalination of sea water at low temperatures, i.e., 100° F., by operating an enclosed system at reduced pressures. However, this arrangement has, in the past, been unfeasible for the volume of gas which come out of solution from the sea water at these reduced pressures are enormous; and large amounts of power are required to pump these gases up to atmospheric pressure where they could be expelled. It has been found, in fact, that a desalination system operating at 100° F. will develop about 360 cubic feet of air and other gases for each 1000 gallons of fresh water it produces. These gases moreover are at a pressure less than $\frac{1}{15}$th of normal atmospheric pressure; and they must, therefore, be pumped continuously up to a pressure 15 times greater than the pressure within the system so that they can be expelled into the atmosphere. The power and equipment requirements associated with such deaeration are enormous and have rendered the low temperature desalination concept economically unfeasible.

According to the present invention, there is provided a novel technique and apparatus for handling liquids and the gases released therefrom when the liquids are subjected to reduced pressures. This novel technique involves withdrawing from the liquid those gases which are released therefrom as the liquid reaches a region of reduced pressure; processing the liquid at the reduced pressure; and then reingesting the withdrawn gases back into the liquid as it returns to a region of higher pressure. In this manner, the released gases can be piped around to bypass the low pressure processing operation. By reingesting the gases into the liquid at a region of low pressure, very little, if any, additional pumping is required; and the pumping compression ratio problem is virtually eliminated.

The reingestion of the withdrawn released gases back into liquid solution is made possible by causing the liquid to flow at a high velocity from its low pressure region to a region of higher pressure and then injecting the gases in the form of bubbles into this liquid flow at a point of low pressure. If the flow is rapid enough, the injected bubbles will be carried by the liquid toward the high pressure region. The continuously increasing pressure of the liquid causes the bubbles to be recompressed; and, because the flowing liquid has previously been deaerated it is capable of absorbing a considerable portion of the gases back into solution.

In the illustrative embodiments the liquid is made to flow from a low pressure region to a high pressure region by subjecting it to a barometric leg. This serves to maintain a reduced pressure at the upper portion of the leg even while the liquid is in motion and flowing through the system. The bypassed gases are injected at low pressure in the form of bubbles near the upper liquid surface within the barometric leg; and are swept down toward a region of higher pressure by the rapidly moving liquid. The actual ingestion may be accomplished by expelling the gases into the barometric leg just below its liquid surface in the leg; or by producing a turbulence in the vicinity of the liquid surface and causing the gases to be injected into the resulting foaming mixture.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein in the drawings:

FIG. 1 is a schematic illustration of a generalized liquid processing system embodying the present invention;

FIGS. 2 and 3 are enlarged elevational views, partially in section, of ingestors used in carrying out the present invention; and, FIG. 4 is a schematic representation of a saline water conversion system as adapted to incorporate the principles of the present invention.

In the system of FIG. 1, a liquid 10 is pumped from a supply reservoir 12 and through a supply conduit 14 to a processing unit 16. After leaving the processing unit, the liquid then passes down through a discharge conduit 18 to a discharge reservoir 20. A pump 22 is interposed along one of the conduits in order to maintain movement of the liquid through the system.

The processing unit 16 is illustrated generically and may include means for performing any chemical, mechanical or electrical processing operation wherein the liquid must be subjected to low pressures, and in some cases, to high temperatures. In the usual case, the process would involve some sort of evaporative type apparatus which would allow at least a portion of the liquid to change state. The processing unit 16, it will be noted, is located a considerable distance above the level of the reservoirs 12 and 20. This permits the vertical supply and discharge conduits 14 and 18 to function as barometric legs whereby the liquid pressure in the vicinity of the processing unit is lowered from the ambient pressure by an amount equal to the pressure represented by the column of liquid in these conduits.

A separation chamber 24 is interposed in the supply conduit 14 at a point prior to the processing unit 16 and at the same general level as the processing unit. The separation chamber is provided with an upper portion 26 which rises above the level of the liquid passing through the chamber. This permits the various vapors and released gases which come out of solution from the liquid to pass upwardly so as to avoid the possibility of their obstructing liquid flow through the system.

The upper portion 26 of the separation chamber 24 is connected by means of a bypass conduit 28 to an ingestor 30 interposed near the upper end of the discharge conduit 18. Under certain operating conditions the inlet pressure at the ingestor 30 may be close to the pressure in the separation chamber 24 so as to reduce the tendency of vapors and gases to be withdrawn from the separation chamber and into the ingestor. This situation may be augmented by the provision of a small pump 32 along the bypass conduit 28.

It will be appreciated that the liquid 10 in moving toward the processing unit 16 undergoes a decrease in pressure with a corresponding decrease in capacity to retain dissolved gases. These gases are released from the liquid in the separation chamber 24 and tend to collect in its upper portion 26. The liquid then passes freely into the processing unit 16 wherein it undergoes a particular processing operation. Because the vapors and released gases are withdrawn from the liquid as it passes through the separation chamber 24, the liquid in effect becomes deaerated and the process, in the usual case, will be more efficiently carried out.

Since the liquid moves continuously through the system, the released gases tend to accumulate in the upper portion 26 of the separation chamber 24; and unless these gases are removed their accumulation will cause an increase of pressure within the upper portion of the system; so that the desired vacuum and ability to extract the dissolved gases from the liquid is lost.

The continuous removal of the released gases is accomplished in the present arrangement with little or no compressive pumping. This is made possible by directing these gases through the bypass conduit 28 around the processing unit 16 and reingesting them into the liquid flow beyond the processing unit. This reingestion takes place at the ingestor 30 which, as will be explained more fully hereinafter, causes the formation of small bubbles in the liquid at a point near the upper end of the discharge conduit 18. These bubbles, depending upon their size, the nature of gas within them and the density and viscosity of the liquid, will tend to rise from the ingestor to the processing unit at a particular velocity. However, so long as the velocity of the downwardly moving liquid in the discharge conduit exceeds this particular velocity, the bubbles will be swept down toward the discharge reservoir 20. As the bubbles proceed downwardly, the liquid pressure around them increases causing the bubbles to compress. This in turn reduces their buoyancy and ensures their "capture" by the downwardly moving column of liquid.

The increasing pressure of the downwardly moving liquid plus the fact that the liquid was previously deaerated and is therefore capable of absorbing gases into solution, enhances the dissolving effect of the liquid upon the gases contained within the ingested bubbles. In this manner, the gases are removed from the separation chamber and brought to atmospheric pressure without the need for pumps of large compression ratios.

The ingestor shown in the enlarged fragmentary view of FIG. 2 comprises an extension 28' of the bypass conduit 28 protruding into the discharge conduit 18. The size of the extension and the discharge conduit are, of course, chosen to permit free and unobstructed downward flow of liquid from the processing unit 16 to the discharge reservoir 20. The liquid flow is controlled to maintain a certain head ($h$) of liquid above the point of gas injection. A plurality of holes 34 are provided along the under surface of the extension 28'. The released gases after passing through the bypass conduit 28, enter into the liquid stream of the discharge conduit 18 via the holes 34. The size of these holes determines the size of the bubbles formed in the liquid stream and consequently their buoyancy or tendency to rise to the liquid surface. The size of these holes must therefore be sufficiently small so that the bubble buoyancy may be overcome by the downwardly moving liquid in the discharge conduit. This, of course, will depend upon the velocity of liquid flow, the density of the liquid and the density of the gases.

An alternate form of ingestor shown in FIG. 3 comprises a liquid stream forming element 36 in the upper portion of the discharge conduit 18 and an opening 38 in the side of the discharge conduit at a point between the upper liquid level in the discharge conduit and the liquid stream forming element 36. The liquid stream forming element 36 may simply comprise a perforated plate or any other element capable of dividing liquid flow into a number of separate streams. The opening 38 is arranged to bring the bypass conduit 28 into communication with the discharge conduit 18.

In operation, liquid from the processing unit 16 flows down through the liquid stream forming element 36 where it is divided into a plurality of streams which spray down upon the upper surface of the liquid in the discharge conduit causing considerable turbulence and splashing in this region. The vapors and gases which pass through the bypass conduit 28 are injected into this turbulent region whereupon they become intermixed with the liquid and form a foam-like mixture. This foam-like mixture is made up of very small bubbles of vapor and gas which are individually formed and enclosed by the splashing liquid. As the liquid proceeds down the discharge conduit 18 it carries the foam along with it so that the bubbles of vapor and gas become compressed and redissolved in the liquid. It should be noted that the turbulent or foam technique is a particularly efficient way in which to cause the gases to be drawn down into the flowing liquid stream. This is because the natural cohesiveness of the splashing liquid develops a certain amount of surface tension so that it readily forms bubbles around pockets of the injected air or gas. Now the surface tension or inherent strength of these bubbles is relatively unaffected by the decreased pressure conditions whereas the average impingement energy of the enclosed and surrounding low pressure gases is considerably less than under normal atmospheric pressure. Thus the bubbles are in effect exceptionally strong carriers for the gases and are especially effective to bring them down into liquid solution at the lowest possible pressure.

As indicated previously, the present invention is particularly advantageous in conjunction with an evaporative type sea water desalination system such as shown in FIG. 4. In this system, sea water, which under normal conditions contains dissolved air in the neighborhood of 20–21 parts per million of water, is subjected to a pressure reduction and a temperature rise which reduces its dissolving capacity to only a few parts per million. Since this air comes out of solution at very low pressure, it is necessary to provide means for its continuous removal.

The desalination arrangement shown in FIG. 4 is patterned after the controlled flash systems now described in pending patent applications, Ser. No. 241,465, filed Nov. 27, 1962, now Patent No. 3,214,350, and Ser. No. 372,858, filed June 5, 1964.

As shown in FIG. 4, there is provided a supply conduit 40 up through which sea water is pumped, as by a centrifugal pump 42. The incoming sea water first passes through cooling tubes 43 of a condenser 44 and then up through a heating device 46. The heating device may, for example, be the condenser of a steam power plant. The heated sea water is then passed through a pressure reducing valve 48 and is admitted into a feeding reservoir 50 which forms a part of a fresh water recovery unit 52. The recovery unit, including the feeding reservoir 50, is maintained at low pressure by means of a barometric leg 54 to which the recovery unit is exposed and through which discharge of excess saline water from the unit takes place.

The feed reservoir 50 is arranged to permit water to flow down into and through the recovery unit 52. During the course of this downward flow about $\frac{1}{10}$ of the water evaporates, the heat of vaporization being supplied by the unevaporated $\frac{9}{10}$. This unevaporated water is discharged to sea out through the barometric leg 54 while the vapors pass around a baffle plate arrangement 64 and into a fresh water recovery chamber 68. As shown, the passage around the baffle plate arrangement 64 leading into the chamber 68 is higher than the opening 66 leading to the barometric leg output 54. Consequently the unevaporated saline water at the bottom of the unit 52 will pass out through the barometric leg 54 and not enter the chamber 68. The condenser unit 44 is also located within the fresh water recovery chamber 68. The vapors in passing over the condenser coils are cooled to a point where they condense and drip down through a recovery tube 70 to a fresh water collecting device 72.

Under a particular set of operating conditions, given here for purposes of illustration only, the temperature in the feed reservoir 50 is 100° F. while its pressure is about 4 inches of mercury (absolute). At the bottom of the unit 52, the temperature is 90° F. and the pressure is 2 inches of mercury (absolute), the decreased pressure at the lower height being attributable to friction losses and to the conversion of energy to vaporization of a portion of the downwardly flowing brine.

The water in the feed reservoir 50 is maintained under conditions of reduced pressure which allows it to hold in solution far less air and other dissolved gases than it held in the sea. Accordingly, these gases become released and accumulate in the top of the feed reservoir. Unless the gases are continuously removed, their accumulation will develop a back pressure preventing further movement of liquid through the fresh water recovery unit. The feed reservoir 50 in effect acts as the separation chamber 24 of the preceding embodiment.

In order to remove the accumulated gases and vapors from the upper portion of the feed reservoir, there is provided according to the present invention, a bypass conduit 74 which leads from the upper portion of the feed reservoir to an ingestor 76 in the upper end of the barometric leg 54. Since the pressure in the feed reservoir (4 inches mercury) is higher than that at the discharge opening 66 (2 inches mercury) the vapors and gases will be withdrawn from the feed reservoir, bypassed around the recovery unit 52 via the bypass conduit 74, and reinjected into the saline water discharge through the ingestor 76 in the barometric leg 54.

Inevitably, a certain amount of the dissolved gases are retained in liquid solution until the liquid is subjected to the lower pressure (2 inches mercury) at the bottom of the unit 52. The gases which are released at this point behave more like vapors than liquids and consequently flow past the baffle plates 64 and into the fresh water recovery chamber 68. Because these gases are non-condensible they tend to accumulate in the chamber while the vapors upon contacting the coils 43 of the condenser element 44 are condensed to form fresh water. Eventually the ratio of non-condensible gases to condensible vapors in the chamber reaches such a limit that the condenser no longer operates. In order to alleviate this situation, there is provided a second bypass conduit 78 which extends from the fresh water recovery chamber 68 to a second ingestor 80 in the barometric leg 54. Thus the recovery chamber is cleared of non-condensible released gases in substantially the same manner as the feed reservoir 50. In this connection it was deemed most practical to inject the released condenser gases into the discharge water inasmuch as this water constituted approximately 99 percent of the total water passing through the system. However, it should be noted that the desalinated water also is deaerated and therefore is capable of absorbing the released gases into solution. Thus at least a portion of either the condenser gases or even the feed reservoir gases can be injected in a similar manner into the desalinated water output line. In this case, the desalinated water output line would itself be formed as a barometric leg.

It will be realized that the pressure within the fresh water recovery chamber 68 is very close to that at the upper end of the barometric leg 54. Consequently, in order to ensure sufficient movement of gases from the chamber, a small auxiliary pump 82 may be inserted into the second bypass line.

It should be noted that the "barometric leg" shown and described in each of the two illustrative embodiments, merely represents one specific device for causing liquid to flow from a region of low pressure to a region of higher pressure. Also, it will be understood that the height of the barometric leg may be reduced to a great extent and a pump inserted at its lower end for augmenting its pressure increasing effects.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. A method of distilling a liquid comprising the steps of causing said liquid to flow rapidly from a source upwardly through a conduit into a low pressure region, releasing dissolved non-condensable gases therein, subjecting a portion of said liquid to evaporation in said low pressure region, separating the evaporated portion, and condensing and recovering same in liquid form, returning the unevaporated portion of said liquid to said source by causing that unevaporated portion to flow rapidly down to said source through a barometric leg, and preventing pressure buildup which tends to occur through the release of said dissolved, non-condensable gases in said low pressure region by conveying the released gases to the top of said barometric leg and injecting said gases into the downwardly flowing liquid in said leg while maintaining the downward velocity of the liquid in said leg at a value sufficient to overcome the buoyancy of said gases in said liquid, whereby said gases become entrained by the rapidly flowing liquid and are carried along thereby to become compressed by the increasing pressure of the liquid in said stream.

2. A method of distilling a liquid comprising the steps of causing said liquid to flow rapidly from a source upwardly through a conduit into a low pressure region releasing dissolved non-condensable gases therein; subjecting a portion of said liquid to evaporation in said low pressure region, separating the evaporated portion, and condensing and recovering same in liquid form, returning liquid toward said source by causing it to flow rapidly down toward said source through a barometric leg, and preventing pressure buildup which tends to occur through the release of said dissolved, non-condensable gases in said low pressure region by conveying the released gases to the top of said barometric leg and injecting said gases into the downwardly flowing liquid in said leg while maintaining the downward velocity of the liquid in said leg at a value sufficient to overcome the buoyancy of said gases in said liquid, whereby said gases become entrained by the rapidly flowing liquid and are carried along thereby to become compressed by the increasing pressure of the liquid in said stream.

3. A method as in claim 2 wherein the pressure in said low pressure region is maintained in the vicinity of the pressure in said chamber.

4. A method as in claim 2 wherein said gases are injected in the form of bubbles in said liquid stream, and wherein the velocity of said liquid stream is maintained at a volume sufficient to overcome the buoyancy of said bubbles.

5. In an evaporative type distillation system the combination comprising: an evaporation unit having an upper reservoir chamber, a discharge conduit extending downwardly from said chamber and forming a barometric leg which maintains reduced pressure in said evaporation chamber, a liquid supply system including pumping and conduit means for supplying liquid to the upper portion of said evaporation chamber and to become subjected to the reduced pressure therein, baffle means directing unevaporated water from said evaporation chamber toward said discharge conduit, a recovery chamber located with respect to said baffle means so as to receive only gases and vapors from said evaporation chamber, a condenser element located within said recovery chamber, a bypass conduit extending from the upper region of at least one of said chambers to said discharge conduit and an ingestor device coupling said bypass conduit to the upper region of said discharge conduit and operative to cause gases passing through said bypass conduit to be injected in the form of bubbles into the downwardly moving stream of liquid in said discharge conduit.

6. A system as in claim 5 wherein said bypass conduit extends from said upper reservoir chamber to said barometric leg.

7. A system as in claim 5 wherein said bypass conduit extends from said recovery chamber to said barometric leg.

8. A system as in claim 5 wherein said discharge conduit is arranged to receive the same unevaporated liquid which passes through said evaporation unit.

9. A system as in claim 5 wherein said ingestor device comprises an extension of said bypass conduit protruding into said discharge conduit, said extension being formed with holes therethrough which permit gases to be ingested into said discharge conduit in the form of bubbles, said holes being of a diameter less than that of bubbles whose buoyancy overcomes downward movement of liquid in said column.

10. A system as in claim 5 wherein said ingestor means includes a liquid stream forming element located within said liquid conduit and arranged to produce a turbulent region between said element and the upper surface of liquid in said column whereby gases from said bypass conduit pass into said turbulent region and are thereby formed into foam and are swept down with liquid flowing downwardly through said discharge conduit.

11. In an evaporative type desalination system the combination comprising; an evaporation chamber, a discharge conduit extending downwardly from said chamber and forming a barometric leg which maintains reduced pressure in said evaporation chamber, a saline water supply system including pumping and conduit means for supplying saline water to the upper portion of said evaporation chamber and to become subjected to the reduced pressure therein, baffle means directing unevaporated water from said evaporation chamber toward said discharge conduit, a fresh water recovery chamber located with respect to said baffle means so as to receive only gases and vapors from said evaporation chamber, a condenser element located within said fresh water recovery chamber, a bypass conduit extending from the upper region of said fresh water recovery chamber to said discharge conduit and an ingestor device coupling said bypass conduit to the upper region of said discharge conduit and operative to cause gases passing through said bypass conduit to be injected in the form of bubbles into the downwardly moving stream of water in said discharge conduit.

12. Apparatus as in claim 11 wherein said bypass conduit includes pumping means for augmenting the flow of gases toward said ingestor device.

13. An evaporative type desalination system comprising an evaporation chamber, a discharge conduit extending downwardly from said chamber and forming a barometric leg which maintains reduced pressure in said evaporation chamber, a saline water supply system including pumping and conduit means for causing saline water to flow into and to become subjected to the reduced pressures within said evaporation chamber, said supply system further including heater means for raising the temperature of the water passing therethrough, a separation chamber located in the path of saline liquid flow at a point of reduced pressure ahead of said evaporation chamber, a fresh water recovery chamber, baffle elements located at the output of said evaporation chamber and operative to separate liquids from gases at the output of said evaporation chamber and to direct said liquids into said discharge conduit and said gases into said fresh water recovery chamber, a condenser element located within said fresh water recovery chamber, first and second bypass conduits extending, respectively, from the upper portions of said separation chamber and said fresh water recovery chamber, and ingestor means associated with each of said bypass conduits and connecting same to the upper portion of said discharge conduits in a manner such that the gases from said separation chamber and said fresh water recovery chamber are injected in the form of bubbles into the stream of discharged water flowing through said discharge conduit.

References Cited
UNITED STATES PATENTS

| | | | |
|---|---|---|---|
| 2,006,985 | 7/1935 | Claude et al. | 55—55 |
| 2,200,620 | 5/1940 | Findley | 55—191 |
| 2,490,659 | 12/1949 | Snyder. | |
| 2,723,001 | 11/1955 | Hoff | 55—68 |

REUBEN FRIEDMAN, *Primary Examiner.*

C. N. HART, *Assistant Examiner.*